United States Patent

Gueugneaud

[11] Patent Number: 5,857,690
[45] Date of Patent: Jan. 12, 1999

[54] BICYCLE FRAME OF COMPOSITE MATERIAL, MOLDS FOR OBTAINING SUCH A FRAME AND FRAME-MOLDING METHOD

[75] Inventor: Jean-Marc Gueugneaud, Saint-Clair-de-la-Tour, France

[73] Assignee: Time Sport International, Varennes-Vauzelles, France

[21] Appl. No.: 750,038

[22] PCT Filed: May 16, 1995

[86] PCT No.: PCT/FR95/00633

§ 371 Date: Nov. 29, 1996

§ 102(e) Date: Nov. 29, 1996

[87] PCT Pub. No.: WO95/32887

PCT Pub. Date: Dec. 7, 1995

[30] Foreign Application Priority Data

Jun. 1, 1994 [FR] France .................................. 94/06681

[51] Int. Cl.⁶ .................................................. B62K 19/02
[52] U.S. Cl. ...................................... 280/281.1; 280/288.3
[58] Field of Search .................................. 280/274, 275, 280/281.1, 283, 288.3

[56] References Cited

U.S. PATENT DOCUMENTS 5,253,890 10/1993 Takamiya et al. .................... 280/281.1
5,271,784 12/1993 Chen et al. ........................... 280/281.1
5,445,400  8/1995 Martin et al. ......................... 280/281.1

FOREIGN PATENT DOCUMENTS 0 491 363   6/1992  European Pat. Off. .
2 528 002  12/1993  France .
2 702 730   9/1994  France .
WO 93/08421 4/1993  WIPO .

*Primary Examiner*—Kevin Hurley
*Attorney, Agent, or Firm*—Young & Thompson

[57] ABSTRACT

A composite bicycle frame comprises a diagonal down tube connected via a bottom bracket to a saddle tube and two rear forks, back stays, and a cross-bar between the top of the saddle tube and the steering tube. The diagonal tube, saddle tube, and rear forks form a first sub-assembly which is molded in one piece, while the cross-bar, saddle joint and upper end of the steering tube form a second sub-assembly, also in one piece, and the two sub-assemblies are joined with adhesive.

10 Claims, 4 Drawing Sheets

BICYCLE FRAME OF COMPOSITE MATERIAL, MOLDS FOR OBTAINING SUCH A FRAME AND FRAME-MOLDING METHOD

The invention relates to a bicycle frame, of composite material, of the sort which comprise a diagonal down tube connected by a bottom bracket crankset housing to a seat tube and to two chain stays extending backward, diverging from the bottom bracket crankset housing, a seat stay connecting the ends of the chain stays to a top part of the seat tube, and a longitudinal top tube connecting the seat tube to a steering bush which provides the link between this longitudinal tube and the top end of the diagonal down tube.

Bicycle frames of composite material, that is to say of material based on carbon fibers or equivalent fibers, has the advantage of a substantial reduction in weight.

Current frames of composite material can be split, in practical terms, into two major families, namely monocoque frames and frames with composite joints or aluminum joints.

Monocoque frames are produced by molding as a single piece, or possibly by overmolding two parts made beforehand.

This method of manufacture requires a substantial amount of tooling so as to be able to cater for the entire customer demand; a minimum of twelve sizes seems to be necessary for a product at this end of the range, in order to meet the broad spectrum of cyclists' builds.

Tooling investment costs for this type of monocoque-frame manufacture are very high.

Furthermore, the concept of the monocoque frame penalizes the product itself. This is because the operation of molding takes place using a lost core, generally one made of polyurethane or of a foam of an equivalent substance. The weight increase imposed by the molding core which remains inside the tubes of the frame is a substantial drawback because it goes against reducing the weight of the frame. Sometimes inflatable cores are used during molding to avoid lost cores, but the use of such inflatable cores is tricky; what is more, the mold quality is insufficient and requires the added expense of finishing work.

Frames with composite joints, constituting the second family mentioned earlier, are made in a conventional manner. Tubular elements of composite material are bonded together at joints.

The joints are made of composite material, which allows an appreciable weight-saving in comparison to conventional types of joint made of aluminum.

This technology of frames with composite joints makes it possible to produce frames which exhibit good performance both as regards the weight and as regards the mechanical qualities, but the production of joints made of composite material proves expensive and tricky.

Furthermore, there are still just as many assembly and manufacturing operations as there are with a frame with joints made of aluminum or of light alloy. There are also a large number of bonded connections. This results in a high manufacturing cost.

The object of the invention, above all, is to overcome the drawbacks of the two major families of composite frame mentioned earlier. The invention aims, in particular, to provide a frame of composite material which is as rigid as possible and particularly reliable and robust, but which still has an acceptable manufacturing cost.

According to the invention, a bicycle frame of composite material of the sort defined earlier is characterized in that it comprises a first subassembly molded as a single piece consisting at least of the diagonal down tube, of the bottom bracket crankset housing, of the seat tube, of the two chain stays and of the bottom part of the steering bush, and a second subassembly molded as a single piece consisting of the longitudinal top tube, of a seat joint and of the top part of the steering bush, these two subassemblies being joined together by bonding.

Advantageously, the diagonal down tube, the seat tube and the longitudinal top tube have no mold core inside them.

The seat stay generally constitutes a third subassembly molded as a single piece, the top end of which is connected by bonding to a seat stay joint provided on the seat tube and each bottom end of which is connected to a lug itself connected to the rear part of a chain stay.

Advantageously, the bicycle frame comprises a coupling sleeve engaged in the two composite-material parts of the steering bush, these two parts being pushed together end to end and bonded to the coupling sleeve and together.

The coupling sleeve used to join the two composite-material parts of the steering bush together is preferably made of two parts fitted together and bonded. Each part of the coupling sleeve may on its outer end have a flange forming a bearing surface of large diameter than the composite-material bush.

The invention also relates to the molds for producing a frame of composite material according to the invention.

A first mold for producing the first subassembly of the frame consists of two mold halves pushed together along a parting line passing through the axis of the diagonal down tube and the axis of the seat tube, and is characterized in that each mold half comprises two elements joined together, in such a way that they can be taken apart along a parting line orthogonal to the plane of the axis of the diagonal down tube and of the axis of the seat tube and passing through the axis of the bottom bracket crankset housing, a first element of the mold half including a molding cavity for the seat tube and a molding cavity for the chain stay provided at the bottom of a recess capable of taking a core, the conjugate of the recess, which core includes a molding cavity for the chain stay associated with that of the recess, while the second element of the mold half includes a molding cavity for the diagonal down tube and for the bottom pat of the steering bush, the mold allowing a group of first frame subassemblies of different dimensions to be molded while changing only the type of second element of the mold half.

Advantageously, the first element of the mold half includes a molding cavity for the seat tube corresponding to the maximum possible length of the seat tube for the group of composite-material frames to be manufactured with this first element and with several types of second mold-half element.

The mold for the production of the second subassembly of the frame is also composed of two mold halves pushed together along a parting line passing through the axis of the longitudinal top tube and through the axis of the steering bush and of the seat joint, and is characterized in that each mold half comprises two parts corresponding to each of the ends of the longitudinal top tube with, respectively, the top part of the steering bush and the seat joint, and a spacer piece situated between these two parts, this spacer piece having a dimension which can vary, in the direction of the axis of the longitudinal top tube, so as to allow the length of this tube to be varied.

As a preference, the seat stay, constituting the third subassembly of the frame, is identical on all models of frame and the mold for this third subassembly is unique.

The invention also relates to a method for molding a bicycle frame as defined earlier, characterized in that the first subassembly is molded as a single piece using molding formers for the bottom part of the steering bush, the diagonal down tube, the seat tube, it being possible for these formers to be removed subsequently, and a core made of rigid foam for the chain stays, in that the longitudinal top tube with the seat joint and the top part of the steering bush are molded as a single piece using formers which can be removed subsequently, in that the seat stay is molded as a single piece and in that the various subassemblies of the frame are joined together by bonding after the aforementioned formers have been removed.

To prepare the composite-material frame blank, before resin is injected into the mold, formers may be provided, these fitting together so as to allow a framework for the first and the second subassembly to be formed before placing in the mold, and this framework is then covered with composite material, the whole item then being placed in the mold for the injection of the resin.

The former for the seat tube fits, at its bottom end, into the former for the bottom bracket crankset housing, likewise the rigid-foam lost cores for the chain stays. The former for the seat tube joint fits into the former for the seat tube. The former for the bottom part of the steering bush takes the top end of the former for the diagonal down tube.

This former for the diagonal down tube may, according to a first option, pass through the former for the bottom bracket crankset housing so that it can be extracted through this bottom bracket crankset housing former. According to another possibility, the former for the diagonal down tube does not emerge in the bottom bracket crankset housing and it is only after molding that those regions of composite material of the bottom bracket crankset housing which are situated in line with the former of the diagonal down tube are pierced to allow this diagonal down tube former to be extracted.

Apart from the provisions explained hereinabove, the invention consists in a certain number of other provisions which will be dealt with more fully later with regard to an embodiment described with reference to the attached drawings, but which is not in any way limiting.

FIG. 1 of these drawings is a diagrammatic elevation showing the three single-piece subassemblies of a frame according to the invention, before assembly.

Figure 10:
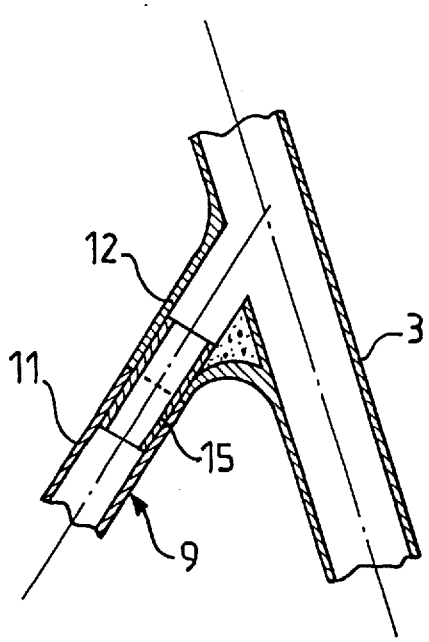

Finally, FIG. 10 is a part axial section illustrating the assembly of the seat stay joint and of the seat stay.

Figure 1:
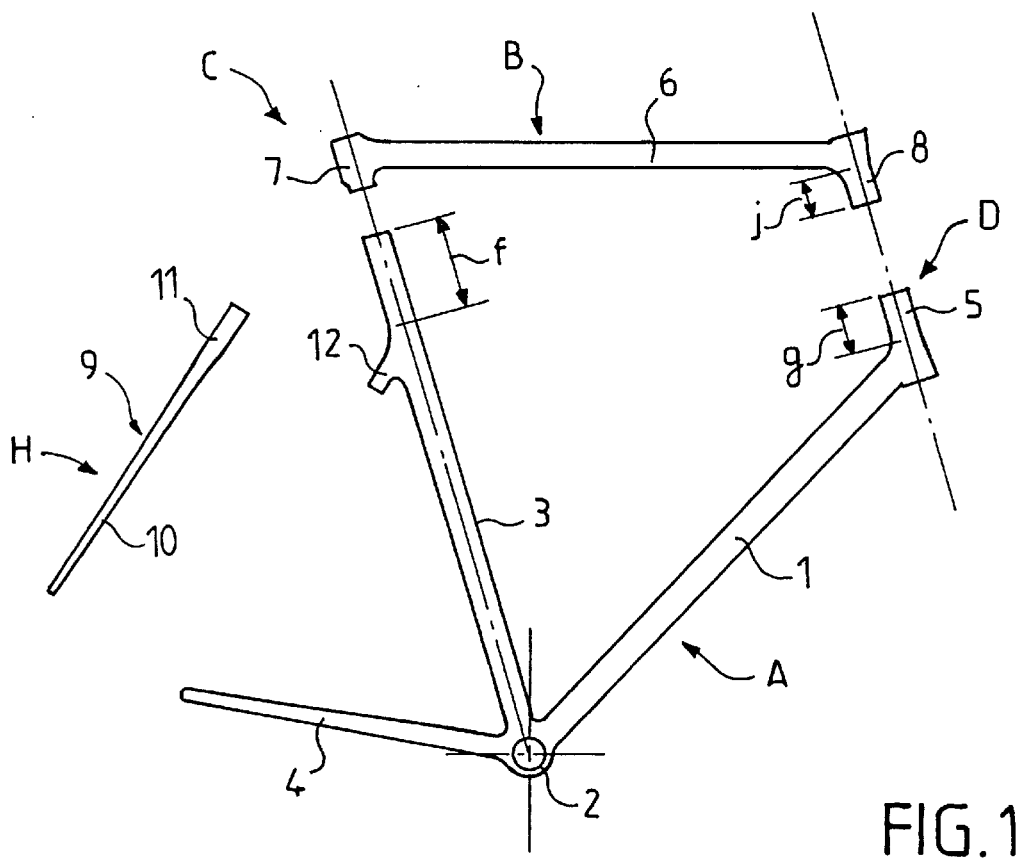

Referring to FIG. 1, it is possible to see a bicycle frame C of composite material, before assembly, in accordance with the invention.

The frame C comprises a first subassembly A molded as a single piece consisting of the diagonal down tube 1, of the bottom bracket crankset housing 2, of the seat tube 3, of the two chain stays 4 which extend backward, diverging from the bottom bracket crankset housing 2, and of the bottom part 5 of the steering bush D.

The frame comprises a second subassembly B molded as a single piece and consisting of the longitudinal top tube 6, of a seat joint 7 and of the top part 8 of the steering bush. The top tube 6, in the example under consideration, is a horizontal tube; this tube could, however, be inclined, especially downward from the seat joint 7 toward the steering bush.

Figure 8:
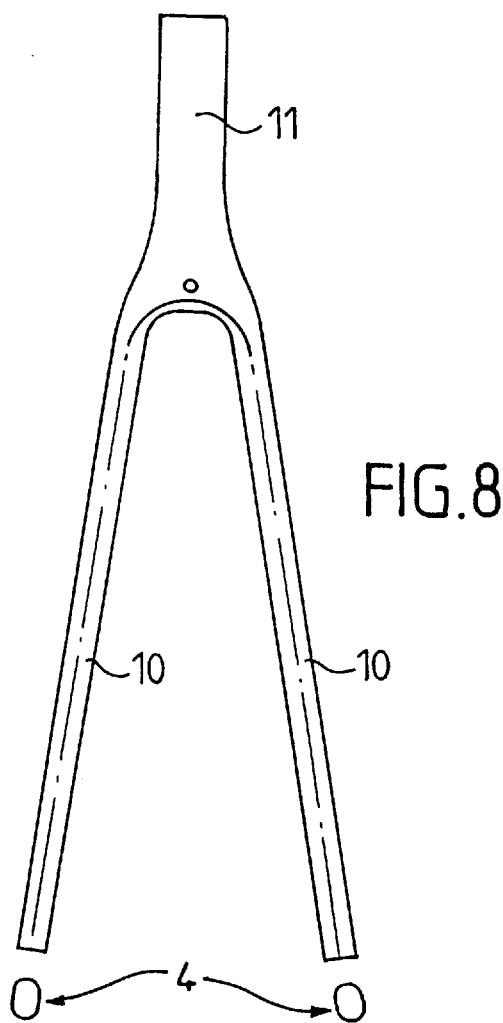
FIG. 8 is an elevation of the seat stay.

A third subassembly H molded as a single piece consists of the seat stay 9 including, as visible in FIG. 8, two branches 10 forming a sort of rear fork, these being connected at their top end to a single tubular element 11 of larger diameter.

The seat tube 3 is equipped with a seat stay joint 12, of which the position relative to the chain stays and to the bottom bracket crankset housing 2 remains constant. For frames of different sizes, that is to say in which the seat tube 3 has different lengths, keeping the same angle with respect to the chain stays 4, the seat stay 9 remains identical. From one seat tube to another it is the region f lying above the joint 12 which can vary in length. The parts 5 and 8 of the composite-material steering bush will also vary in length in the cylindrical regions g and j in conjunction with the variations in length of the region f.

Because the seat stay 9 remains identical from one frame to another, this seat stay may, in an alternative form, be molded as a single piece with the first subassembly A.

The axis of the seat tube 3 is substantially parallel, or is parallel, to the axis of the steering bush D, so that a conjugate height variation of the region f on the one hand and of the regions j and g on the other hand does not lead to a substantial change in length of the longitudinal top tube 6. In cases where the axes are only substantially parallel, the variation in length created by a variation in height of the region f is of the order of a few tenths of a millimeter, which can be rectified by machining without having to change the tube 6.

It immediately becomes apparent that the solution of the invention makes it possible to produce a group of frames of different sizes, while altering a small number of components.

The three subassemblies are joined together by bonding.

Figure 9:
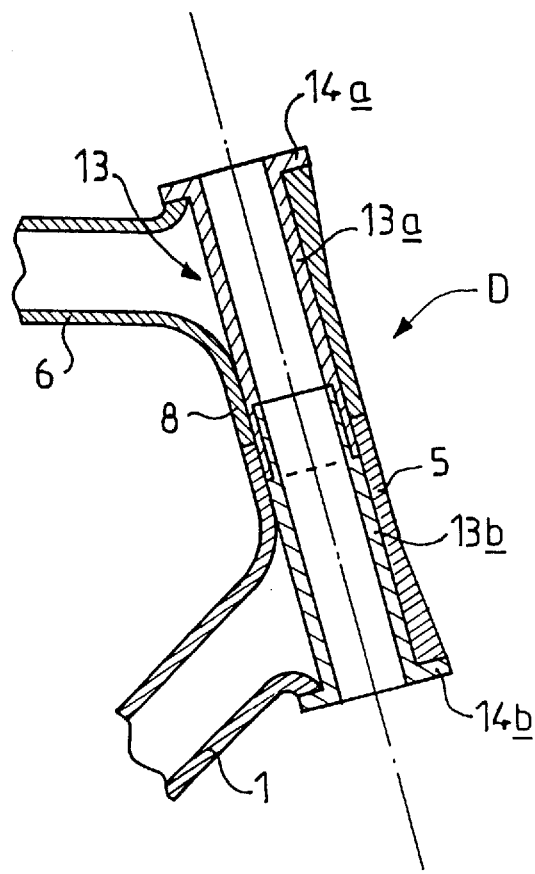
FIG. 9 is an axial section, on a larger scale, illustrating the assembly of the steering bush.

The bottom part 5 and the top part 8 of the composite-material steering bush are assembled, as illustrated in FIG. 9, using a coupling sleeve 13, for example one made of metal or of composite material. This sleeve 13 is made as two cylindrical parts 13a, 13b fitted together at their end which lies inside the frame. Each part 13a, 13b of the sleeve at its outer end has a flange 14a, 14b respectively, these forming bearing surfaces of larger diameter than the parts 8, 5 of composite material of the bush. The parts 13a, 13b are matched so that they fit inside the composite-material parts 5, 8 with the clearance necessary for a film of adhesive. The parts 13a, 13b are joined together by bonding where they fit together. The composite-material parts 5 and 8 are pushed end to end and are bonded to the exterior surface of the parts 13a, 13b and are bonded together. The assembly thus produced is particularly reliable.

FIG. 10 illustrates the assembly of the tubular element 11 of the seat stay 9 and of the seat stay joint 12 provided at the top of the seat tube 3. The tubular joint 12 and the element 11 have the same internal diameter and the same external diameter. A sleeve 15 fitted without clearance over substantially half its length into the joint 12 and into the element 11 is bonded to these two elements placed end to end and also bonded together.

Figure 2:
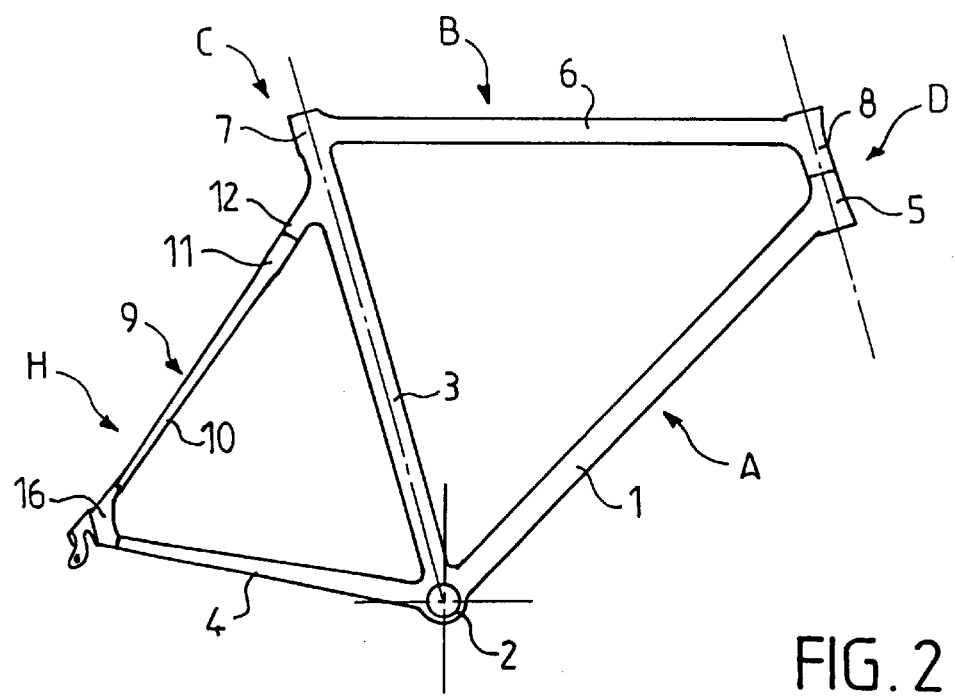
FIG. 2 shows, in a similar way to FIG. 1, the frame produced after the three subassemblies have been assembled.

The bottom end of the branches 10 of the seat stay is connected to the rear end of the chain stays 4, in the conventional way, by a bonded-on metal lug 16 visible in FIG. 2.

The tubes 1, 3 and 6 are hollow and have no mold core in the assembled frame. The chain stays 4 include a lost molding core, for example one made of polyurethane, the weight of which is very low owing to the small internal volume of these chain stays 4. The same is true of the branches 10 of the seat stay 9 which may have a lost core made of polyurethane foam, without the weight of the frame being substantially altered.

The tooling, molds and formers employed to produce the frame of the invention will now be considered.

Figure 3:
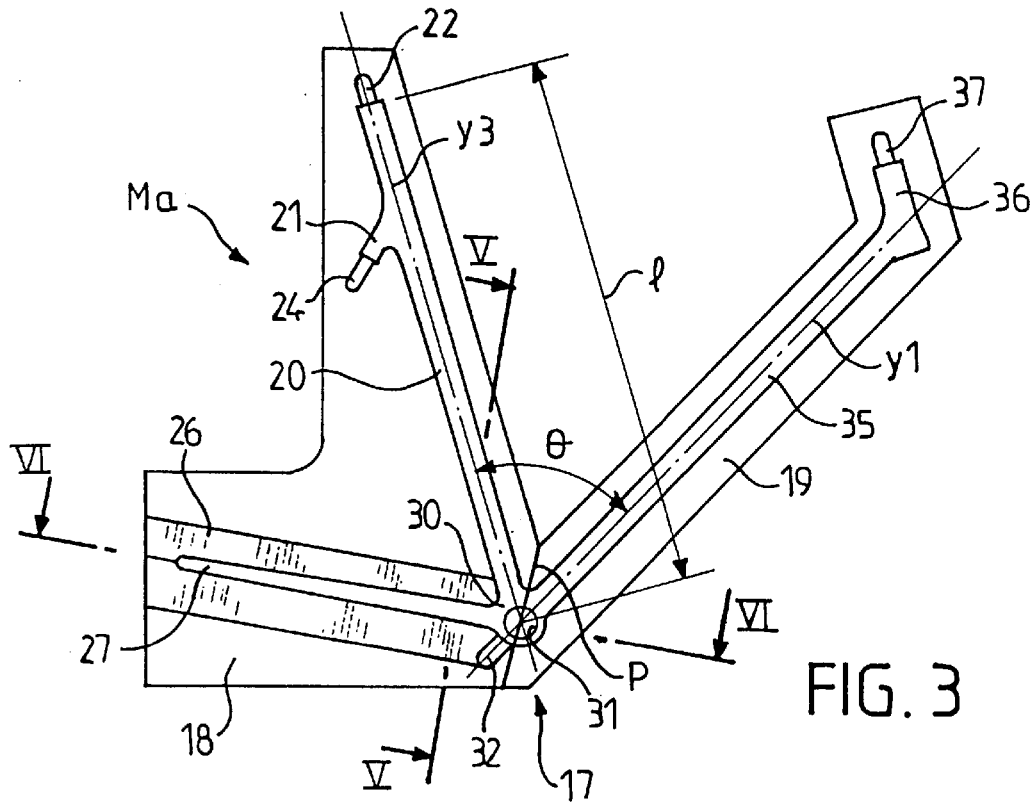
FIG. 3 is a diagrammatic plan view of a mold half with its two elements, for producing the first subassembly.

FIG. 3 illustrates a mold half 17 for molding the first subassembly A. The complete mold Ma for producing this first subassembly A consists of two mold halves 17, 17' (see FIGS. 4 and 5) pressed together along a parting line 2 passing through the axis of the diagonal down tube 1 and of the seat tube 3. The mold half 17', the conjugate of the mold half 17 represented in FIG. 3, is symmetric with the latter with respect to the parting line Q. The parts of the mold 17' will be denoted by the same numerical references plus the ' symbol. The mold Ma is opened by parting the two mold halves 17, 17' on either side of the line Q.

The mold half 17 comprises two elements 18, 19 pushed together along a parting line P orthogonal to the plane of the geometric axes y1, y3 of the diagonal down tube and of the seat tube. In other words, the plane P is orthogonal to the plane of FIG. 3. The elements 18, 19 are joined mechanically together in such a way that they can be taken apart.

The element 18, substantially in the shape of a right angle with its concave side pointing backward, includes a molding cavity 20 for the seat tube. This molding cavity 20 corresponds to a semicylindrical cavity and to half the cross section of the seat tube 3. The molding cavity 20 includes a sort of stump 21 corresponding to a molding half cavity for the seat stay joint 12. The top end of the molding cavity 20 is extended by a coaxial housing 22 of smaller size intended to take the top end of a former 23 visible in FIG. 4. Similarly, the molding cavity 21 is extended, downward, by a coaxial housing 24, of smaller size intended to take the bottom end of a former 25 (FIG. 4) for the seat stay joint 12.

In the embodiment under consideration, the formers 23 and 25, together with the other formers which will be dealt with later, are removable metal formers which can be disengaged by withdrawal from the tubes after molding.

The formers could be made of any other material, especially a material which can be eliminated, for example, by dissolving or melting after the tubes have been molded. By way of indication mention may be made of the material known under the tradename "Paraplast" manufactured by the Hexcel company.

The length 1 of the molding cavity 20 measured between the top end of this molding cavity and the geometric axis of the bottom bracket crankset housing corresponds to the maximum length of the seat tube of a group of frames of different sizes to be manufactured using the mold Ma. When the frame manufactured corresponds to a size of seat tube 3 shorter than the length 1, all that is required is for this tube to be cut to the desired length at its top end, above the seat tube joint 12.

Figure 5:
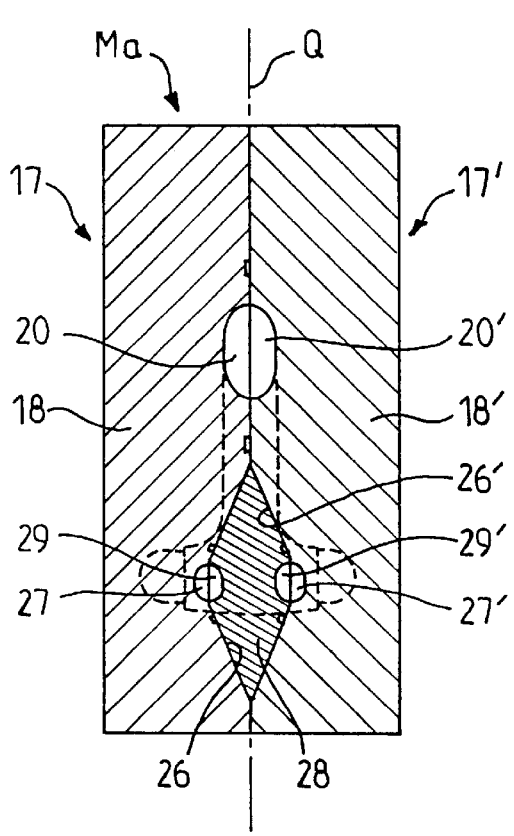
FIG. 5 is a section, on a larger scale, on line V—V, FIG. 3, of the two mold halves pushed together.

The mold element 18 includes a recess 26 with a cross section of substantially open V shape, as visible in FIG. 5. The two faces of the recess 26 are flat. Provided in the bottom of this recess 26 is a molding cavity 27 corresponding to half the section of a chain stay 4.

The recess 26 is intended to take half the cross section of a core 28 (FIG. 5) whose cross section through a sectioning plane orthogonal to the plane of the geometric axes of the chain stays 4 is substantially diamond shaped. The other half section of the core 28 is received in the recess 26' of the element 18' of the other mold half 17'. The core 28 includes molding cavities 29, 29' which are the conjugates of the cavities 27, 27' for molding the chain stays 4.

Figure 6:
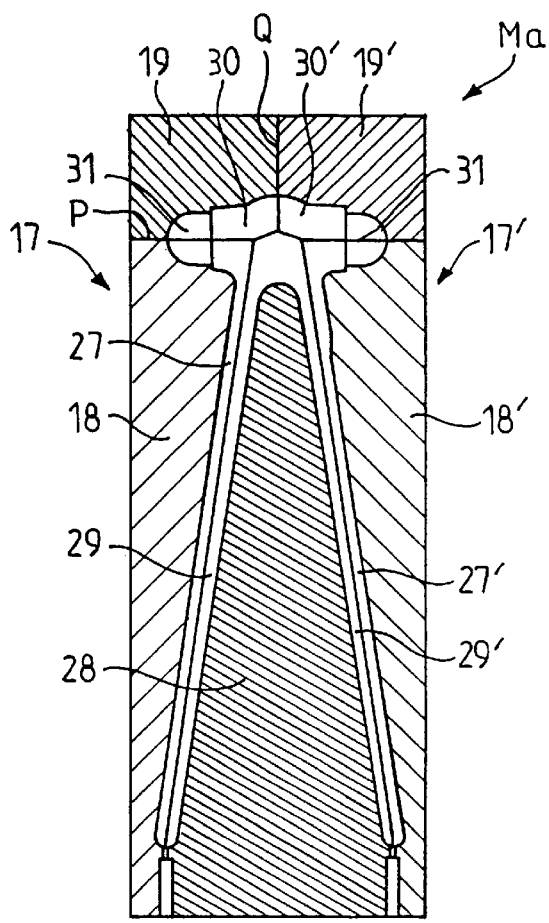
FIG. 6 is a section on line VI—VI, FIG. 3, on a larger scale, of the two mold halves pushed together.

FIG. 6, which corresponds to a section through the mold and through the core along the plane of the geometric axes of the chain stays, reveals the triangular-wedge shape of the core 28, the transverse dimension of which increases progressively from the region close to the bottom bracket crankset housing toward the rear of the chain stays.

The bottom part of the molding cavity 20 and the front part of the molding cavity 27 emerge in a molding cavity 30 (see FIG. 3) for molding the bottom bracket crankset housing 2. This molding cavity 30 connects with a cylindrical housing 31 (see FIG. 6) of which the axis, perpendicular to the plane of FIG. 3, passes through the intersection of the geometric axes y1 and y3. This housing 31 has the parting line P passing through it so that a semicylindrical cavity is situated in the element 18 and the complementary cavity is situated in the element 19.

In the example illustrated in FIG. 3, a housing 32, coaxial with the axis y1 of the seat tube, emerges in the cavity 30 and extends on the opposite side from the element 19. This housing 32 is intended to take the end 33 (FIG. 4) of the metal former 34 for the diagonal down tube 1.

The element 19 includes a molding cavity 35 corresponding to half the section of the diagonal down tube. This molding cavity 35 at the bottom connects with the molding cavity 30 for the bottom bracket crankset housing. At the top, the molding cavity 35 emerges in a molding cavity 36, corresponding to half the section of the bottom part 5 of the steering bush. The top end of the molding cavity 36 is extended by a coaxial housing 37 of smaller diameter intended to take the top end of the former 38 for the bottom part 5 of the steering bush.

A metal former 39 (FIG. 4) is designed to fit into the housing 31. In the example under consideration, passing through the former 39 is a diametral hole capable of allowing the passage of the bottom end of the former 34 which projects, via its end 33, from the other side. The former 39 further includes a housing capable of taking the bottom end of the former 23 engaged by translation in the direction of its axis into this housing in the former 39.

The former 39 further includes housings capable of receiving, respectively, the end of cores 40, for example made of polyurethane foam, intended for the molding of the chain stays 4. The cores 40 are lost and remain inside the chain stays 4 upon release from the mold; when the sleeve 39 is extracted, the ends of the cores 40 which are engaged in the corresponding housings of the sleeve 39 are sheared off.

The former 23 comprises a housing into which the top end of the former 25 fits, while the former 38 at the bottom includes a housing into which the top end of the former 34 fits.

Figure 4:
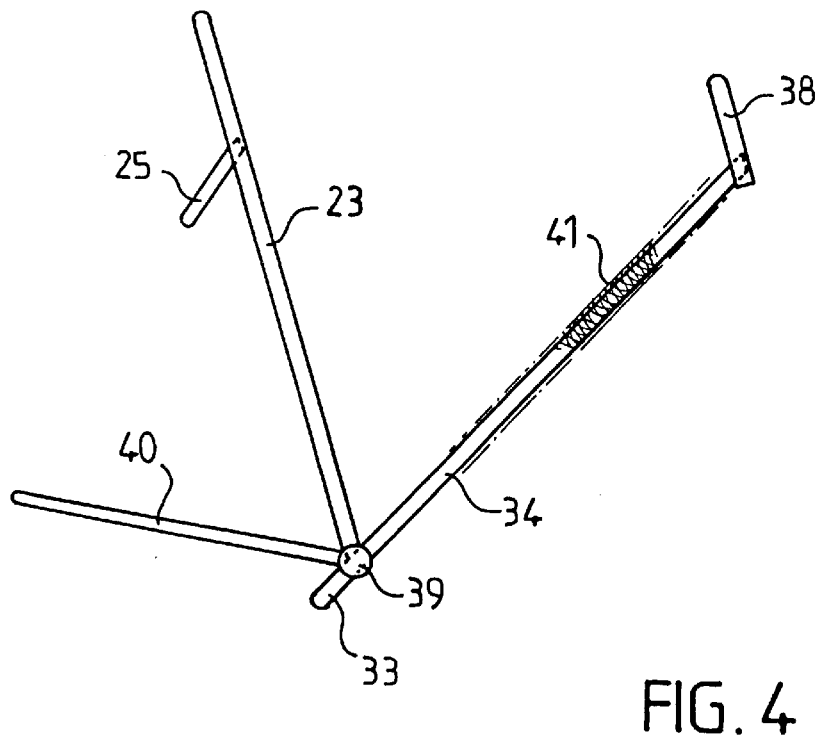
FIG. 4 is an elevation of the formers fitted together, in the process of being covered with composite material with a view to subsequent molding of the first subassembly.

With a view to molding, the various formers 23, 25, 34, 39 and 38 are fitted together and the cores 40 are put in place to form a framework for the first frame subassembly as illustrated in FIG. 4. The formers are then covered with composite material, that is to say with braids 41 of carbon fibers or similar material. This covering provides a continuous jacket around the framework, especially in the regions of the bottom bracket crankset housing (former 39) and in the regions where the diagonal down tube 1 and the part 5 of the steering housing are joined together.

The blank thus prepared is then put in place with a view to injecting resin, for example an epoxy resin, in a conventional manner, as described, for example, in FR-A-2 684 062.

To obtain different sizes of frames within a certain range, the element 18 remains the same and is assembled with various types of element 19, the axis y1of the mold cavity 35 of which will form, with the axis y3 of the molding cavity 20, an angle which varies from one type of element 19 to another, this corresponding to different lengths of top tube 6. The height of the molding cavity 36 above the molding cavity 30 will remain constant, to keep the front forks a constant length.

It is thus possible with a smaller amount of tooling (only the element 19 changes) to manufacture a relatively wide range of different sizes of frame.

It should be noted that, in the element 19, the molding cavity 36 may be designed with the maximum height so that for one and the same angle it will be possible, by chopping off the top end of the part 5 and of the seat tube 3, to produce frames of different heights but with the same length of top tube 6.

After injection of the resin and heat treatment under given conditions, the operation of molding the subassembly A is complete. The mold Ma is then opened, the two mold halves 17, 17' are separated, then the two elements 18, 19 of the mold half 17, in which the molded subassembly A remains, are separated.

The former 34 is then withdrawn by pulling the bottom end 33 in the axial direction. The former 38 can then be pulled clear.

The former 25 is extracted, and this then makes it possible to pull the former 23 out by the top in the axial direction. It is finally possible to extract the former 39 in the direction of its axis, cutting off the ends of the cores 40 which remain in the chain stays 4 as already indicated.

As an alternative, the former 39 could be made in two parts to make it easier to extract.

Still in an alternative form, the element 18 may have no housing 32, while the former 35 may be shorter than is shown in FIG. 4 so that it stops before it reaches the former 39 into which it has not been fitted. In these conditions, after release from the mold, the former 25 is extracted first of all, then the former 23; the former 39 can then be extracted, with the ends of the cores 40 being chopped off, since the former 34 does not penetrate the former 39. The bottom bracket crankset housing 2 is obtained with a continuous peripheral wall. In order to extract the former 34, a diametral hole is pierced in the wall of the housing 2, in line with the former 34 which can then be extracted by sliding out axially downward. The region of the housing 2 in which the hole is made to allow the former 34 to pass is only lightly stressed, which means that the strength of the frame is not affected.

Figure 7:
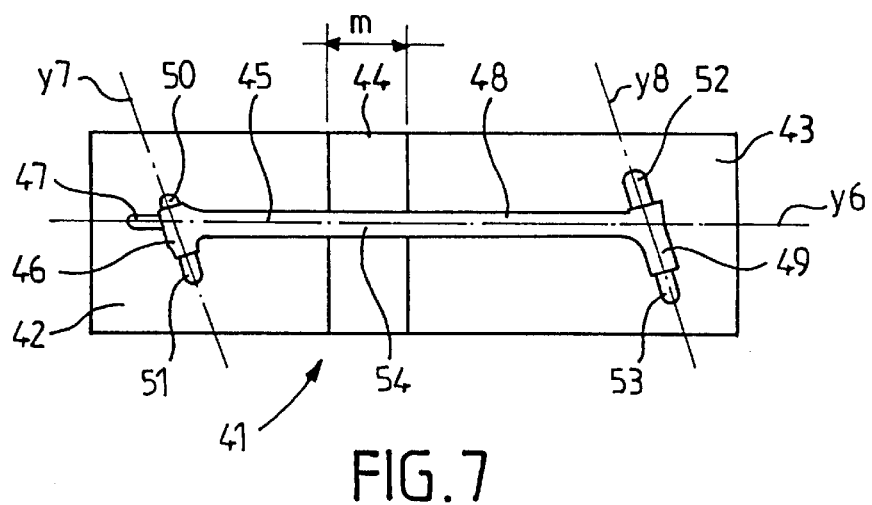
FIG. 7 is a plan view of the mold half for the second subassembly.

FIG. 7 illustrates, in plan, a mold half 41 for manufacturing the second subassembly B.

The mold for producing the second subassembly B is composed of the mold half 41 visible in FIG. 7 and of a second mold half pressed onto the first along a parting line passing through the geometric axis y6 of the top tube 6 and through the geometric axes y8 and y7 of the part 8 of the steering bush and of the seat joint 7.

The mold half 41 is composed of two end parts 42, 43 and of a spacer piece 44, all these elements having the shape of right-angled parallelepipeds. The parting lines between the spacer piece 44 and the end parts 42, 43 are orthogonal to the axis y6.

The end part 42 includes a semicylindrical molding cavity 45 corresponding to half the cross section of the rear part of the top tube 6. This molding cavity 45 emerges in a cavity 46 corresponding to half the cross section of the seat joint 7. From the molding cavity 46, a housing 47 extends, coaxial with the molding cavity 45, on the opposite side from this molding cavity to take the end of a metal former, not represented, corresponding to the internal volume of the tube 6.

The other part 43 of the mold includes a molding cavity 48 corresponding to half the cross section of the front region of the top tube 6. The molding cavity 48 emerges, at its front end, in a molding cavity 49 corresponding to half the cross section of the top part 8 of the steering bush.

Emerging in the molding cavity 46, as in the molding cavity 47, in the direction of the axis of each molding cavity and at each end, are housings 50, 51 for the molding cavity 46, and 52, 53 for the molding cavity 49, respectively. These housings are intended to take the ends of removable metal formers, not represented, which pass through the joint 7 and the part 8 of the bush during molding.

It should be noted that the molding cavity 49 is closed at the front along the axis y6 so that the molded part 8 has no openings at the front. The seat joint 7 will include an opening corresponding to the passage of the former for the tube 6.

The spacer piece 44 comprises a molding cavity 54 corresponding to an intermediate region of the half cross section of the tube 6 and providing a connection between the molding cavities 45 and 48.

In order to produce various types of subassembly B, in which the length of the tube 6 will be different, all that is required is to provide spacer pieces 44 which, from one type to another, will differ in the dimension m along the axis y6.

If, for example, 7 types of mold-half element 19 (FIG. 3) are provided, these being associated with one and the same type of element 18, a corresponding seven types of spacer piece 44 will be used to obtain the desired lengths of top tube 6, while the inclinations of the geometric axes of the tube 3 and of the seat tube 7 on the one hand, and of the steering bushes 5 on the other, will not be changed.

For all these various types, the parts 42 and 43 of mold half 41 of FIG. 7 remain the same.

It is thus clear that the investment in tooling is considerably reduced.

As explained with regard to FIG. 4, the formers, not represented, which are intended for the manufacture of the subassembly B fit together. It will not be possible to extract the former from the tube 6 until after the former has been extracted from the part 8 of the steering bush and the former of the joint 7 have been extracted.

In order to expand the range of bicycle frames manufactured according to the invention, it is possible to provide one or more other types of element 18 and of parts 42, 43 in which, in particular, the angles of inclination of the geometric axes y3, y7 and y8 may be different. Several types of element 19 and of spacer piece 44 will be associated with each unique type of element 18 and of parts 42, 43.

The invention makes it possible to produce a frame of composite material which is very lightweight thanks to the absence of a lost core in the main tubes, namely the diagonal down tube 1, seat tube 3 and top tube 6.

What is more, the bicycle frame according to the invention is very reliable and robust thanks to the reduction in the number of bonded joints which, furthermore, lie in regions which are lightly stressed.

The elimination of cast assembly pieces and the reduction of areas where extra machining is required make it possible substantially to reduce the manufacturing cost.

I claim:

1. Bicycle frame of composite material comprising a diagonal down tube (1) connected by a bottom bracket crankset housing (2) to a seat tube (3) and to two chain stays (4) extending backward, diverging from the bottom bracket crankset housing, a seat stay (9) connecting the ends of the chain stays to a top part of the seat tube, and a longitudinal top tube (6) connecting the seat tube (3) to a steering bush (D) which provides the link between this longitudinal tube (6) and the top end of the diagonal down tube (1), characterized in that it comprises a first subassembly (A) molded as a single piece comprising at least the diagonal down tube (1), of the bottom bracket crankset housing (2), of the seat tube (3), of the two chain stays (4) and of the bottom part (5) of the steering bush, and a second subassembly (B) molded as a single piece comprising the longitudinal top tube (6), of a seat joint (7) and of the top part (8) of the steering bush (D), these two subassemblies (A, B) being joined together by bonding.

2. Bicycle frame according to claim 1, characterized in that the seat stay (9) constitutes a third subassembly (H) molded as a single piece, the top end (11) of which is connected by bonding to a seat stay joint (12) provided on the seat tube (3) and each bottom end of which is connected to a lug (16) itself connected to the rear part of a chain stay (4).

3. Bicycle frame according to claim 1, characterized in that the diagonal down tube (1), the seat tube (3) and the longitudinal top tube (6), as well as the steering bush (D) and the seat joint (7) have no core inside them.

4. Bicycle frame according to claim 1, characterized in that the frame comprises a coupling sleeve (13) engaged in the two parts (5, 8) of the steering bush (D) of composite material, these two parts (5, 8) being pushed together end to end and bonded together and bonded to the coupling sleeve (13).

5. Bicycle frame according to claim 4, characterized in that the coupling sleeve (13) is made in two parts (13a, 13b) fitted together and bonded.

6. Mold (Ma) for producing the first subassembly (A) of a bicycle frame according to claim 1, this mold (Ma) comprising two mold halves (17, 17') which are pushed together along a parting line (Q) passing through the axis (y1) of the diagonal down tube and the axis (y3) of the seat tube, characterized in that each mold half (17, 17') comprises two elements (18, 19; 18', 19') joined together in such a way that they can be taken apart along a parting line (P) orthogonal to the plane of the axis (y1) of the diagonal down tube and of the axis (y3) of the seat tube and passing through the axis of the bottom bracket crankset housing (2), a first element (18, 18') including a molding cavity (20, 20') for the seat tube and a molding cavity (27, 27') for the chain stay provided at the bottom of a recess (26, 26') capable of taking a core (28), the conjugate of the recess (26, 26'), while the second element (19, 19') of the mold half includes a molding cavity (35) for the diagonal down tube and for the bottom part (36) of the steering bush, the mold (Ma) allowing a group of first frame subassemblies (A) of different dimensions to be molded while changing only the type of second element (19) of the mold half (17, 17').

7. Mold according to claim 6, characterized in that the first element of the mold half includes a molding cavity for the seat tube (20) corresponding to the maximum possible length (l) of the seat tube for the group of composite-material frames to be manufactured with this first element (18) and with several types of second mold-half element (19).

8. Mold for the production of the second subassembly of a bicycle frame according to claims 1, composed of two mold halves pushed together along a parting line passing through the axis (y6) of the longitudinal top tube and through the axis (y8) of the steering bush and the axis (y7) of the seat joint (7), characterized in that each mold half comprises two parts (42, 43) corresponding to each of the ends of the longitudinal top tube with, respectively, the top part of the steering bush (D) and the seat joint (7), and a spacer piece (44) situated between these two parts (42, 43), this spacer piece having a dimension m which can vary, in the direction of the axis (y6) of the longitudinal top tube, so as to allow the length of this tube to be varied.

9. Method for molding a bicycle frame according to claims 1, characterized in that the first subassembly (A) is molded as a single piece using molding formers (38, 34, 23) for the bottom part of the steering bush, the diagonal down tube, the seat tube, it being possible for these formers to be removed subsequently, and a lost core (40) made of rigid foam for the chain stays, in that the longitudinal top tube (6) with the seat joint (7) and the top part (8) of the steering bush are molded as a single piece using formers which can be removed subsequently, in that the seat stay (9) is molded as a single piece and in that the various subassemblies of the frame are joined together by bonding after the aforementioned formers have been removed.

10. Method for molding a bicycle frame according to claim 9, characterized in that, to prepare the composite-material frame blank, before resin is injected into the mold, formers (23, 25, 34, 38, 39) are provided, these fitting together so as to allow a framework for the first (A) and the second (B) subassembly to be formed before placing in the mold, and this framework is then covered with composite material, the whole item then being placed in the mold for the injection of the resin.

* * * * *